United States Patent
Engel (10) Patent No.: US 10,323,682 B2
(45) Date of Patent: Jun. 18, 2019

(54) APPARATUS AND METHOD FOR AN ACTUATOR MOUNTING ASSEMBLY WITH A ROCKER PIN

(71) Applicant: Kolberg-Pioneer, Inc., Yankton, SD (US)

(72) Inventor: Gary Engel, Yankton, SD (US)

(73) Assignee: Kolberg-Pioneer, Inc., Yankton, SD (US)

( * ) Notice: Subject to any disclaimer, the term of this patent is extended or adjusted under 35 U.S.C. 154(b) by 354 days.

(21) Appl. No.: 15/211,439

(22) Filed: Jul. 15, 2016

(65) Prior Publication Data

US 2017/0023054 A1 Jan. 26, 2017

Related U.S. Application Data (60) Provisional application No. 62/196,954, filed on Jul. 25, 2015.

(51) Int. Cl.
  *F16C 11/04* (2006.01)
  *B02C 1/04* (2006.01)

(52) U.S. Cl.
  CPC .............. *F16C 11/04* (2013.01); *B02C 1/04* (2013.01)

(58) Field of Classification Search
  CPC ..... Y10T 403/32868; Y10T 403/32877; Y10T 403/32893; Y10T 403/32918; Y10T 403/32951; Y10T 403/32967; Y10T 403/7123; F16C 11/045; A47B 57/42; F16M 11/10
  USPC ....... 403/151, 152, 154, 157, 161, 163, 388; 248/224.8, 284.1
  See application file for complete search history.

(56) References Cited

U.S. PATENT DOCUMENTS

| | | | | |
|---|---|---|---|---|
| 1,940,116 A | * | 12/1933 | Brooks | B02C 13/28 241/197 |
| 3,245,705 A | * | 4/1966 | Fangman | F16J 1/14 403/154 |
| 3,564,978 A | * | 2/1971 | Flitz | F16J 1/14 403/152 |
| 3,722,315 A | * | 3/1973 | Florjancic | B22D 17/26 403/161 |
| 4,242,014 A | * | 12/1980 | Plevak | E21D 23/082 403/154 |
| 4,486,114 A | * | 12/1984 | Rudolph | G01N 29/2487 403/161 |
| 4,493,680 A | * | 1/1985 | Hoffmann | F16G 13/06 16/386 |

(Continued)

*Primary Examiner* — Amber R Anderson
*Assistant Examiner* — Nahid Amiri
(74) *Attorney, Agent, or Firm* — Chambliss, Bahner & Stophel, p.C.

(57) ABSTRACT

A mounting assembly for mounting an actuator having a base end and a piston end on an item of equipment. The mounting assembly comprises a plate that is adapted to be mounted to the item of equipment at a first location, a pin hole that is disposed on the plate and has a raised portion, and a pin that is disposed in the pin hole and has a pin diameter, a longitudinal axis, and a channel. The pin is affixed to the cap end of the actuator, the piston end of the actuator is mounted to the item of equipment at a second location, and the channel of the pin is seated on the raised portion of the pin hole. A method for mounting an actuator comprising providing a mounting assembly and moving the actuator between a retracted position and an extended position.

19 Claims, 7 Drawing Sheets

(56) References Cited

U.S. PATENT DOCUMENTS

| | | | | |
|---|---|---|---|---|
| 4,556,360 | A * | 12/1985 | Hoffmann | B23Q 7/008 198/468.2 |
| 4,575,898 | A * | 3/1986 | Carlson | E02F 9/006 16/274 |
| 4,652,167 | A * | 3/1987 | Garman | F16C 11/02 29/434 |
| 5,242,238 | A * | 9/1993 | Warner | B60G 13/001 248/289.11 |
| 5,807,007 | A * | 9/1998 | Stemper | F16C 11/02 403/13 |
| 6,764,244 | B2 * | 7/2004 | Pansiera | A61F 5/0125 403/102 |
| 7,393,033 | B1 * | 7/2008 | Bisso, IV | F16G 15/06 294/82.1 |
| 7,788,993 | B2 * | 9/2010 | Wood | B64C 1/06 280/93.51 |
| 2004/0067095 | A1 * | 4/2004 | Pansiera | A61F 5/0125 403/102 |
| 2009/0269133 | A1 * | 10/2009 | Van Amelsfoort | E02F 3/3604 403/408.1 |
| 2012/0230756 | A1 * | 9/2012 | Shido | B60S 1/345 403/161 |
| 2013/0087138 | A1 * | 4/2013 | Ubach Cartategui | F16C 11/04 126/696 |
| 2014/0157635 | A1 * | 6/2014 | La Reau | F16C 17/10 37/443 |
| 2015/0360228 | A1 * | 12/2015 | McCloskey | B02C 2/045 241/32 |
| 2016/0001293 | A1 * | 1/2016 | Raihala | E04G 23/082 241/267 |
| 2016/0116109 | A1 * | 4/2016 | Borloz | F16M 11/046 248/284.1 |

* cited by examiner

APPARATUS AND METHOD FOR AN ACTUATOR MOUNTING ASSEMBLY WITH A ROCKER PIN

CROSS-REFERENCES TO RELATED APPLICATIONS/PATENTS

This application relates back to and claims the benefit of priority from U.S. Provisional Application for Patent Ser. No. 62/196,954 titled "Tension System" and filed on Jul. 25, 2015.

FIELD OF THE INVENTION

The present invention relates generally to apparatuses and methods for mounting actuators, and particularly to apparatuses and methods for pin assemblies for mounting actuators.

BACKGROUND AND DESCRIPTION OF THE PRIOR ART

It is known to use a variety of apparatuses and methods for mounting actuators to items of equipment. Conventional apparatuses and methods, however, suffer from one or more disadvantages. For example, conventional apparatuses and methods for mounting actuators use pin-and-hole assemblies that result in undesirable friction, heat, and wear. Conventional apparatuses and methods for mounting an actuator experience undesirable failures and have an undesirably short lifespan. Conventional apparatuses and methods for mounting an actuator undesirably have an axis of rotation about the center of the pin. In addition, conventional apparatuses and methods use pins that undesirably move rotationally relative to the actuator.

It would be desirable, therefore, if an apparatus and method for mounting an actuator could be provided that would reduce friction, heat and wear. It would also be desirable if such an apparatus and method for mounting an actuator could be provided that would minimize, if not eliminate, failures and have a longer lifespan. It would be further desirable if such an apparatus and method for mounting an actuator could be provided that would have an axis of rotation near the surface of the pin. It would be still further desirable if such an apparatus and method for mounting an actuator could be provided that would have a pin that does not move rotationally relative to the actuator.

ADVANTAGES OF THE PREFERRED EMBODIMENTS OF THE INVENTION

Accordingly, it is an advantage of the preferred embodiments of the invention claimed herein to provide an apparatus and method for mounting an actuator that reduces friction, heat, and wear. It is also an advantage of the preferred embodiments of the invention claimed herein to provide an apparatus and method for mounting an actuator that minimizes, if not eliminates, failures and has a longer lifespan. It is another advantage of the preferred embodiments of the invention claimed herein to provide an apparatus and method for mounting an actuator that has an axis of rotation near the surface of the pin. It is an advantage of the preferred embodiments of the invention claimed herein to provide an apparatus and method for mounting an actuator in which the pin does not move rotationally relative to the actuator.

Additional advantages of the preferred embodiments of the invention will become apparent from an examination of the drawings and the ensuing description.

SUMMARY OF THE INVENTION

The apparatus of the invention comprises a mounting assembly for mounting an actuator having a base end and a piston end on an item of equipment. The preferred mounting assembly comprises a plate that is adapted to be mounted to the item of equipment at a first location, a pin hole that is disposed on the plate and has a raised portion, and a pin that is disposed in the pin hole and has a pin diameter, a longitudinal axis, and a channel. In the preferred mounting assembly, the pin is affixed to the cap end of the actuator, the piston end of the actuator is mounted to the item of equipment at a second location, and the channel of the pin is seated on the raised portion of the pin hole.

The method of the invention comprises a method for mounting an actuator having a base end and a piston end on an item of equipment. The preferred method comprises providing a mounting assembly. The preferred mounting assembly comprises a plate that is adapted to be mounted to the item of equipment at a first location, a pin hole that is disposed on the plate and has a raised portion, and a pin that is disposed in the pin hole and has a pin diameter, a longitudinal axis, and a channel. In the preferred mounting assembly, the pin is affixed to the cap end of the actuator, the piston end of the actuator is mounted to the item of equipment at a second location, and the channel of the pin is seated on the raised portion of the pin hole. The preferred method also comprises moving the actuator between a retracted position and an extended position.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Referring now to the drawings, the preferred embodiment of the apparatus and method for an actuator mounting assembly with a rocker pin in accordance with the present invention is illustrated by FIGS. 1 through 14. As shown in FIGS. 1-14, the preferred mounting assembly is adapted to reduce friction, heat, and wear. The preferred mounting assembly also minimizes, if not eliminates, failures and has a longer lifespan. The preferred mounting assembly also has an axis of rotation near the surface of the pin. The preferred mounting assembly further has a pin that does not move rotationally relative to the actuator.

Figure 1:
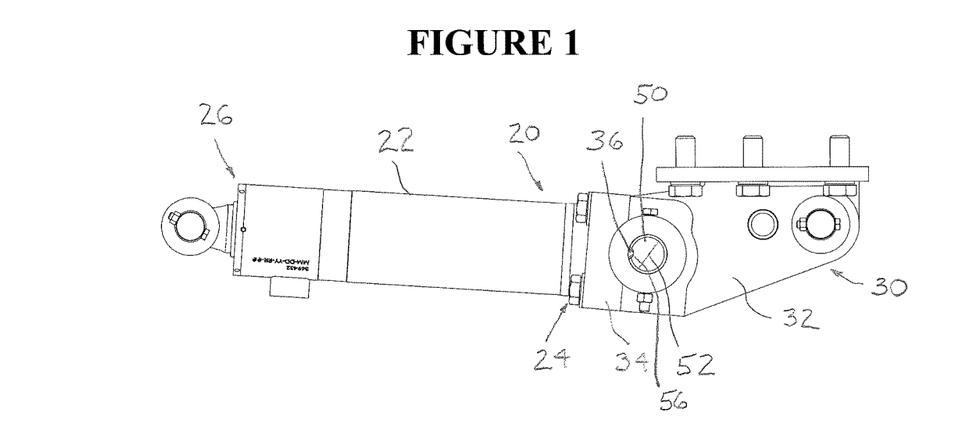
FIG. 1 is a front view of the preferred embodiment of the actuator mounting assembly in accordance with the present invention.

Referring now to FIG. 1, a front view of the preferred embodiment of the actuator mounting assembly in accordance with the present invention is illustrated. As shown in FIG. 1, the preferred mounting assembly is designated generally by reference numeral 20. Preferred mounting assembly 20 is adapted to mount actuator 22 having base end 24 and piston end 26 to an item of equipment such as a rock crusher. Preferred actuator 22 is adapted to move between a retracted position and an extended position. Preferred mounting assembly 20 comprises a plate which is adapted to be mounted to the item of equipment at a first location. Preferably, mounting assembly 20 comprises at least two plates which are spaced apart from each other. More preferably, mounting assembly 20 comprises plate 32 which is mounted to the item of equipment at a first location and block 34 which is removably attached to the first plate.

Still referring to FIG. 1, preferred mounting assembly 20 also comprises a pin hole which is disposed on the plate and has a raised portion and a pin hole diameter. As shown in FIG. 1, in preferred mounting assembly 20 the pin hole is formed in part by canal 40 (see FIGS. 11-12) in plate 32 and block 34 including raised portion 36 (see FIGS. 13-14). It is also contemplated within the scope of the invention that the mounting assembly may have more than one pin hole.

Still referring to FIG. 1, the mounting assembly further comprises pin 50 which is disposed in the pin hole and has pin diameter 52, longitudinal axis 54 (see FIG. 2), and channel 56. Preferably, the pin hole diameter (see FIGS. 11-12) is larger than pin diameter 52, and pin 50 comprises a plurality of channels 56 that are disposed substantially parallel to longitudinal axis 54.

Still referring to FIG. 1, in preferred mounting assembly 20, pin 50 is affixed to cap end 24 of actuator 22, piston end 26 of actuator 22 is mounted to the item of equipment at a second location, and channel 56 of the pin is seated on raised portion 36 of block 34. Also in preferred mounting assembly 20, the pin hole diameter is larger than pin diameter 52. Preferably, the second location of the item of equipment is adapted to move relative to the first location of the item of equipment. While FIG. 1 illustrates the preferred configuration and arrangement of the actuator mounting assembly, it is contemplated within the scope of the invention that the mounting assembly may be of any suitable configuration and arrangement.

Figure 2:
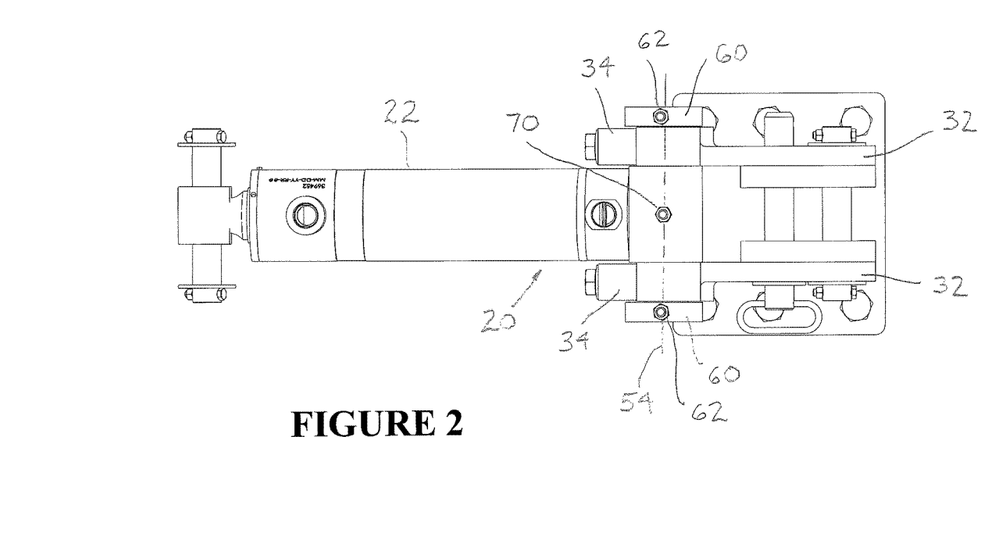
FIG. 2 is a bottom view of the preferred mounting assembly illustrated in FIG. 1.

Referring now to FIG. 2, a bottom view of preferred mounting assembly 20 is illustrated. As shown in FIG. 2, preferred mounting assembly 20 comprises actuator 22, a pair of first plates 32, a pair of blocks 34, a pair of caps 60 which are disposed on the ends of pin 50, a pair of cap bolts 62 which are adapted to attach the caps to the pin, and actuator bolt 70 which is adapted to affix the pin to base end 24 of the actuator and prevent the pin from rotating relative to the actuator.

Figure 3:
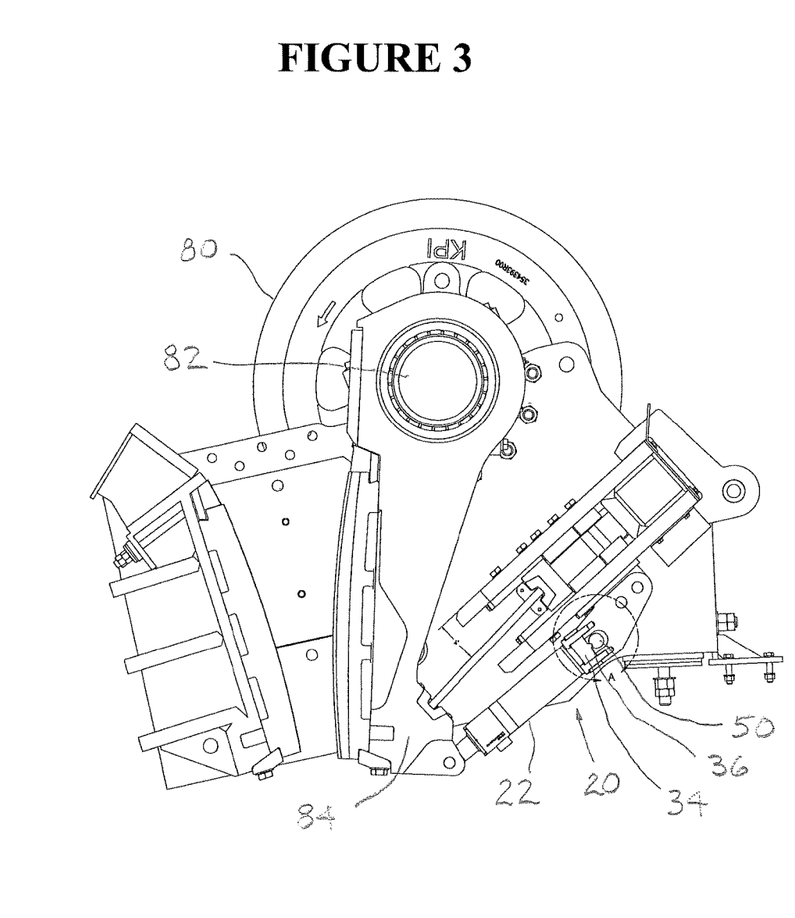
FIG. 3 is a partial sectional view of the preferred mounting assembly illustrated in FIGS. 1-2 shown on an exemplary rock crusher with the preferred actuator in an extended position.

Referring now to FIG. 3, a partial sectional view of preferred mounting assembly 20 is illustrated on an exemplary rock crusher with preferred actuator 22 in an extended position. As shown in FIG. 3, the exemplary rock crusher is designated generally by reference numeral 80. When preferred actuator 22 is in an extended position, preferred pin 50 is in a first pin position relative to raised portion 36 of block 34, and the rotation of eccentric 82 causes pitman 84 to be in an "closed" position.

Figure 4:
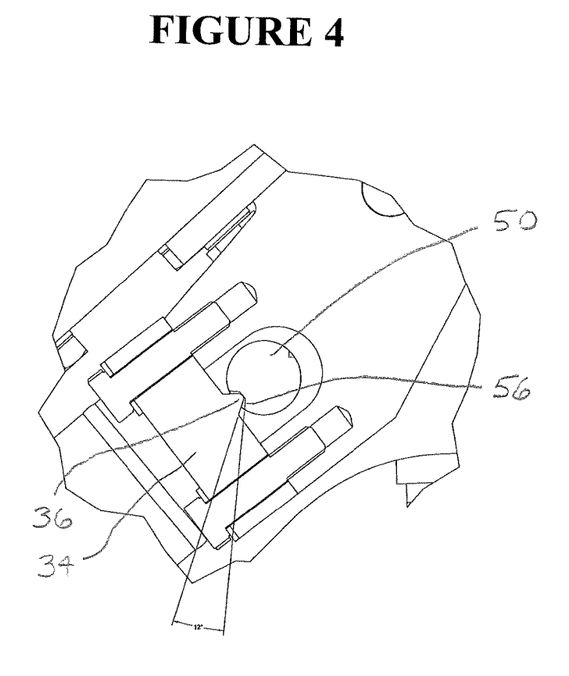
FIG. 4 is a partial sectional view of the preferred mounting assembly illustrated in FIGS. 1-3 showing the preferred pin in the "up" position.

Referring now to FIG. 4, an enlarged partial sectional view of preferred pin 50 in the pin hole of preferred mounting assembly 20 as shown in FIG. 3 is illustrated. As shown in FIG. 4, preferred pin 50 is in the first pin position (i.e., an "up" position relative to raised portion 36 of block 34). When preferred pin 50 is in the "up" position, there is a 12 degree angle between the lower substantially planar, sloped surface of raised portion 36 and the lower substantially planar, sloped surface of channel 56. Preferably, pin 50 is in the illustrated "up" position when the rotation of the eccentric shaft of the rock crusher causes the pitman to be in the "closed" position which causes actuator 22 to be in the extended position.

Figure 5:
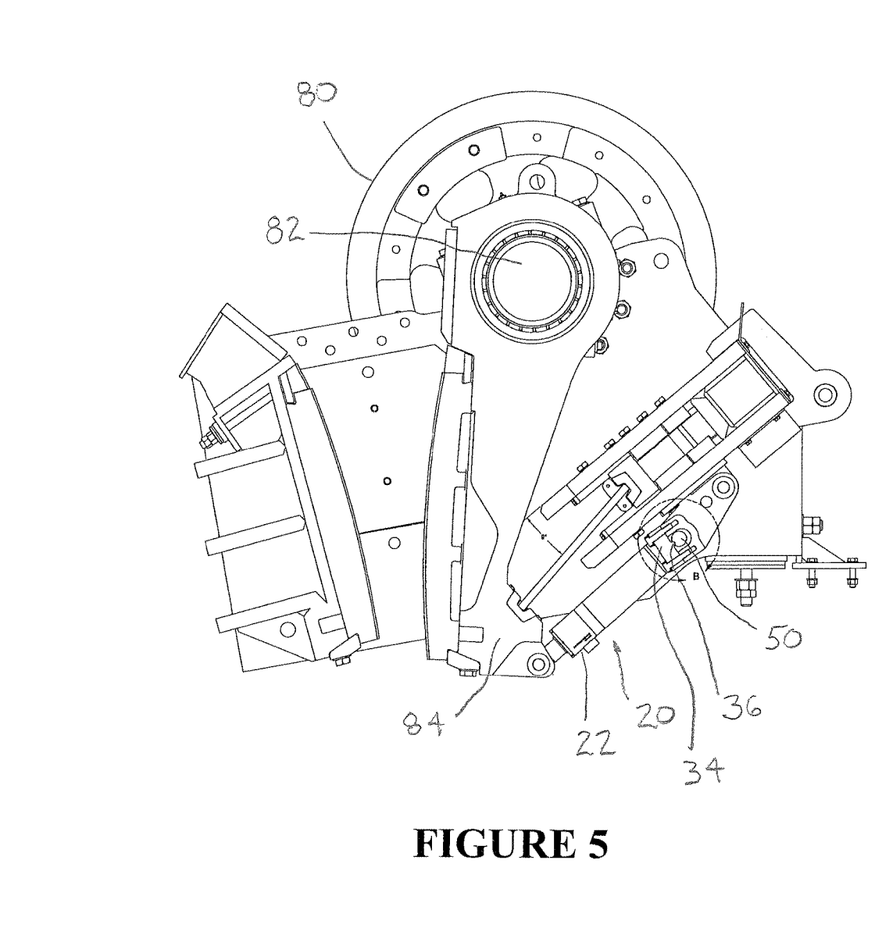
FIG. 5 is a partial sectional view of the preferred mounting assembly illustrated in FIGS. 1-4 shown on an exemplary rock crusher with the actuator in a retracted position.

Referring now to FIG. 5, a partial sectional view of preferred mounting assembly 20 is illustrated on exemplary rock crusher 80 with preferred actuator 22 in a retracted position. When preferred actuator 22 is in an extended position, preferred pin 50 is in a second pin position relative to raised portion 36 of block 34, and the rotation of eccentric 82 causes pitman 84 to be in an "open" position.

Figure 6:
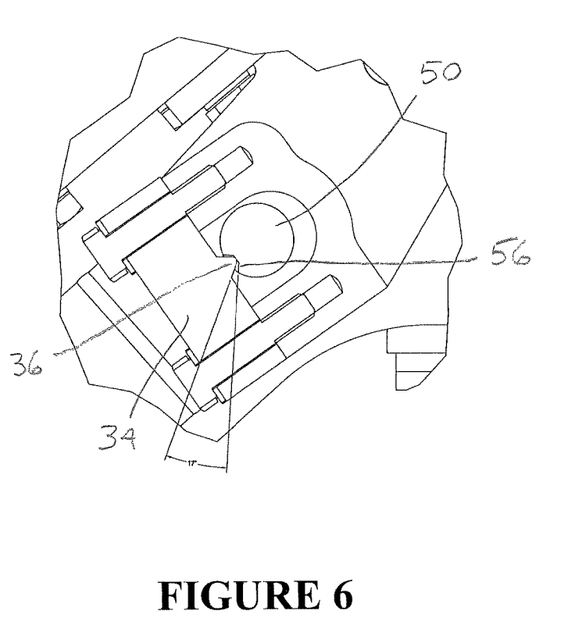
FIG. 6 is a partial sectional view of the preferred mounting assembly illustrated in FIGS. 1-5 showing the preferred pin in the "down" position.

Referring now to FIG. 6, a partial sectional view of preferred pin 50 in the pin hole of preferred mounting assembly 20 as shown in FIG. 5 is illustrated. As shown in FIG. 6, preferred pin 50 is in the second pin position (i.e., a "down" position relative to raised portion 36 of block 34). When preferred pin is in the "down" position, there is a 17 degree angle between the lower substantially planar, sloped surface of raised portion 36 and the lower substantially planar, sloped surface of channel 56. The 5 degree difference between preferred pin 50 in the "up" position and the "down" position represents the 5 degree oscillation experience by actuator 22 during a full rotation of the eccentric shaft. Preferably, pin 50 is in the illustrated "down" position when the rotation of the eccentric shaft of the rock crusher causes the pitman to be in the "open" position which causes actuator 22 to be in the retracted position.

Referring back to FIG. 4 and comparing it with FIG. 6, the combination of preferred raised portion 36 of block 34 and channel 56 of pin 50 minimizes, if not eliminates, frictional sliding movement between the pin and the pin hole. Instead of a conventional rotating pin-and-hole arrangement which results in frictional sliding rotational movement between the pin and the pin hole, the preferred channel 56 and raised portion 36 produces a line contact between the top of the raised portion which oscillates in the channel Because the preferred raised portion 36 and channel 56 arrangement minimizes, if not eliminates, frictional sliding movement between pin 50 and the pin hole, wear is reduced and lifespan is extended.

Figure 7:
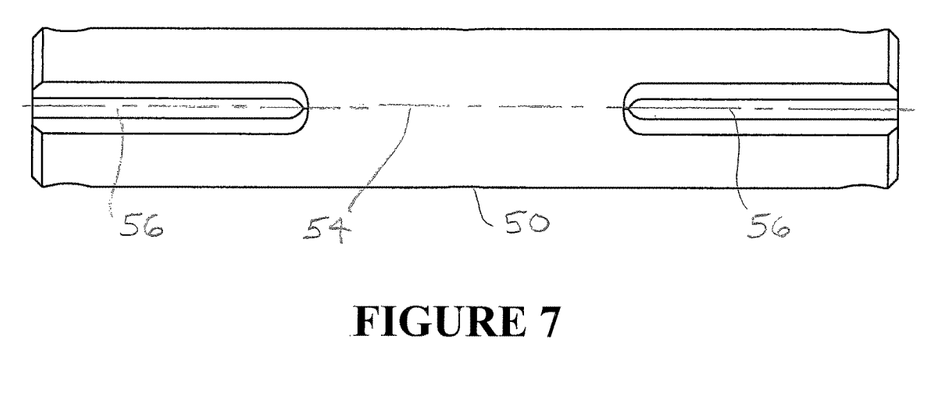
FIG. 7 is a front view of the preferred pin of the preferred mounting assembly illustrated in FIGS. 1-6.

Referring now to FIG. 7, a front view of preferred pin 50 of preferred mounting assembly 20 is illustrated. As shown in FIG. 7, preferred pin 50 comprises a pair of channels 56 which are spaced apart from each other. Preferred channels 56 extend along longitudinal axis 54 of pin 50 and are substantially collinear to each other. Each of preferred channels 56 extends through an end of pin 50 and terminates at a location short of the center of the pin.

Figure 8:
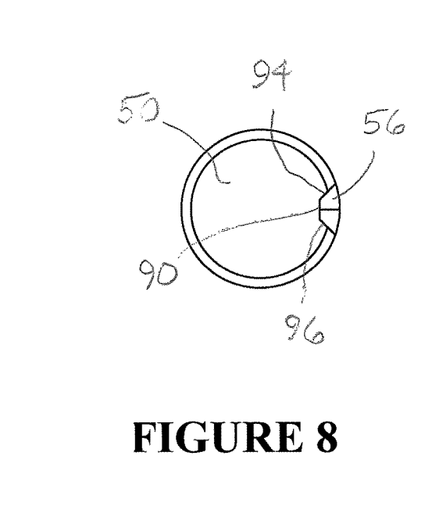
FIG. 8 is a left side view of the preferred pin of the preferred mounting assembly illustrated in FIGS. 1-7.

Referring now to FIG. 8, a left side view of preferred pin 50 of preferred mounting assembly 20 is illustrated. As shown in FIG. 8, preferred pin 50 comprises channel 56. Preferably, channel 56 is defined by a substantially planar base 90 which defines a minimum channel width and a pair of substantially planar sloped walls 94 and 96 which define a maximum channel width.

Figure 9:
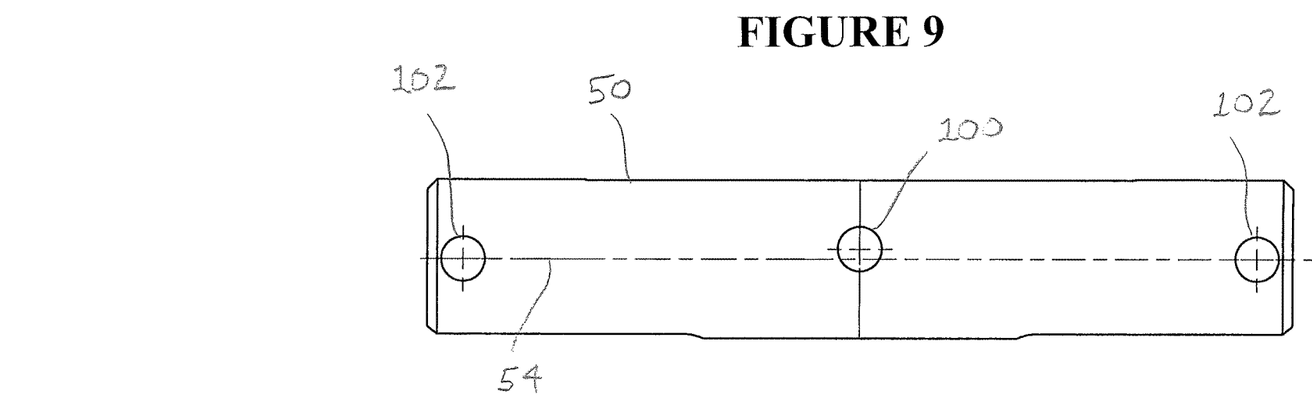
FIG. 9 is a top view of the preferred pin of the preferred mounting assembly illustrated in FIGS. 1-8.

Referring now to FIG. 9, a top view of preferred pin 50 of preferred mounting assembly 20 is illustrated. As shown in FIG. 9, preferred pin 50 comprises a plurality of bolt holes. More particularly, preferred pin 50 comprises actuator bolt hole 100 and a pair of cap bolt holes 102. Preferred actuator bolt hole 100 is adapted to receive actuator bolt 70 that affixes preferred pin 50 to base end 24 of actuator 22. Each of preferred pair of cap bolt holes 102 is adapted to receive a cap bolt 62 that attaches caps 60 to pin 50.

Figure 10:
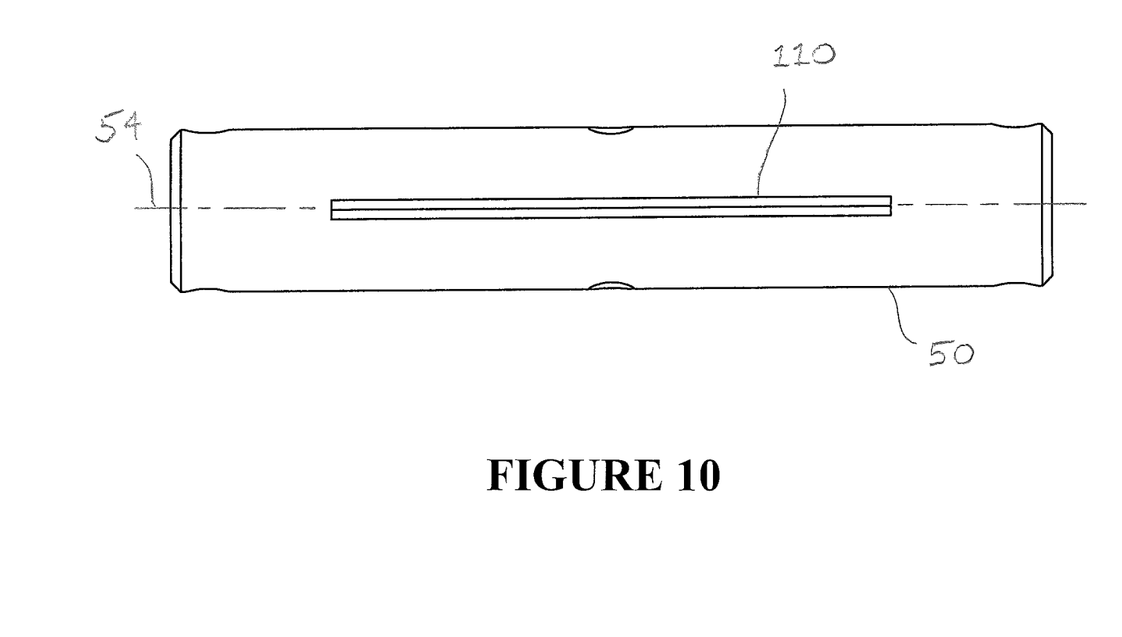
FIG. 10 is a back view of the preferred pin of the preferred mounting assembly illustrated in FIGS. 1-9.

Referring now to FIG. 10, a back view of preferred pin 50 of preferred mounting assembly 20 is illustrated. As shown in FIG. 10, preferred pin 50 comprises groove 110 which is disposed along longitudinal axis 54. Preferred groove 110 is adapted to convey one or more lubricants to base end 24 of actuator 22. While FIGS. 7-10 illustrate the preferred configuration and arrangement of the pin, it is contemplated within the scope of the invention that the pin may be of any suitable configuration and arrangement.

Figures 11, 12:
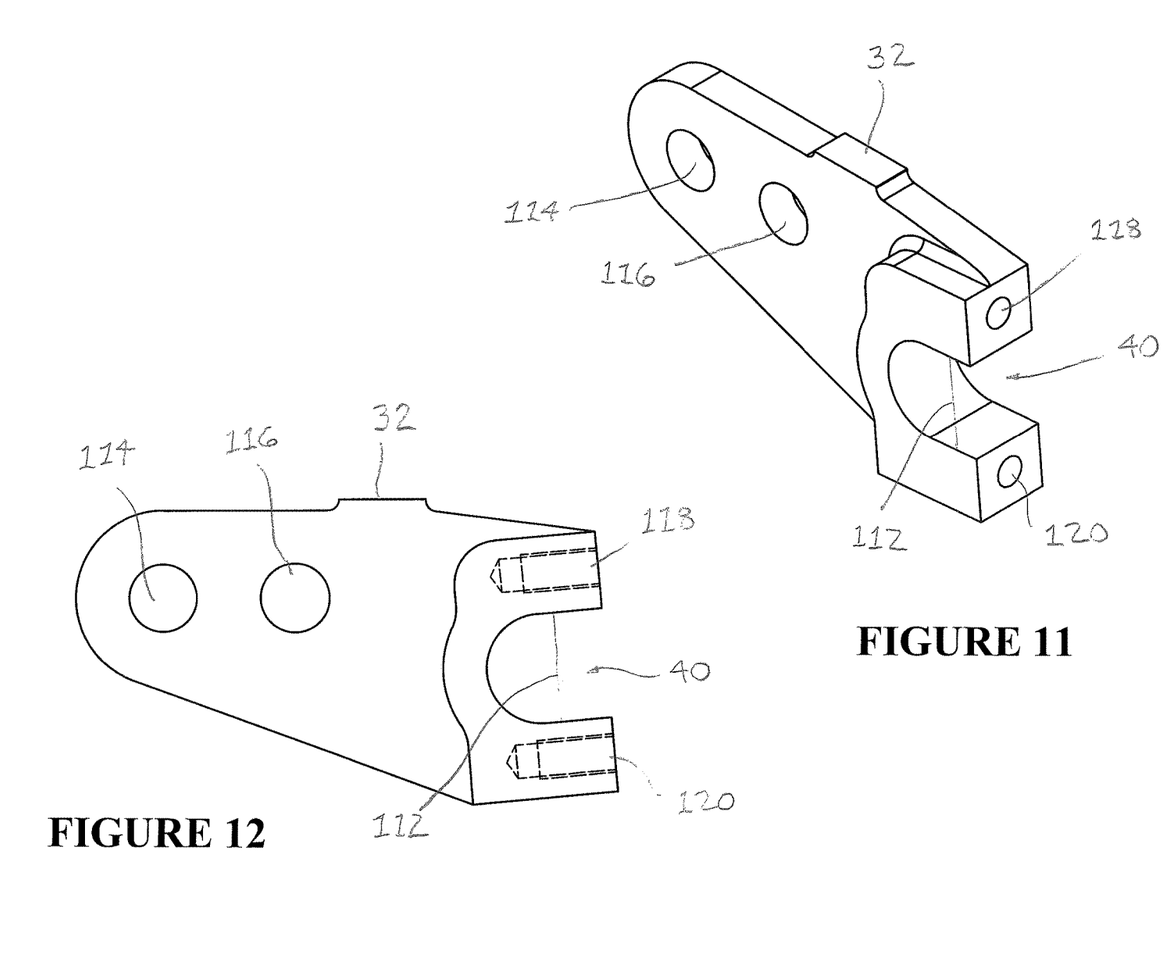
FIG. 11 is a perspective view of the preferred plate of the preferred mounting assembly illustrated in FIGS. 1-10.
FIG. 12 is a front view of the preferred plate of the preferred mounting assembly illustrated in FIGS. 1-11.

Referring now to FIG. 11, a perspective view of preferred plate 32 of preferred mounting assembly 20 is illustrated. As shown in FIG. 11, preferred plate 32 comprises canal 40 which in part defines the pin hole. The remainder of the pin hole is defined by block 34 having raised portion 36. Preferred canal 40 further defines pin hole diameter 112 which is preferably larger than pin diameter 52. Preferred plate 32 also comprises two other pin holes 114 and 116 each of which is adapted to receive a pin and a pair of block bolt holes 118 and 120 each of which is adapted to receive a block bolt.

Referring now to FIG. 12, a front view of the preferred plate 32 of preferred mounting assembly 20 is illustrated. As shown in FIG. 12, preferred plate 32 comprises canal 40 which defines pin hole diameter 112, pin holes 114 and 116, and block bolt holes 118 and 120. While FIGS. 11 and 12 illustrate the preferred configuration and arrangement of the plate, it is contemplated within the scope of the invention that the plate may be of any suitable configuration and arrangement.

Figures 13, 14:
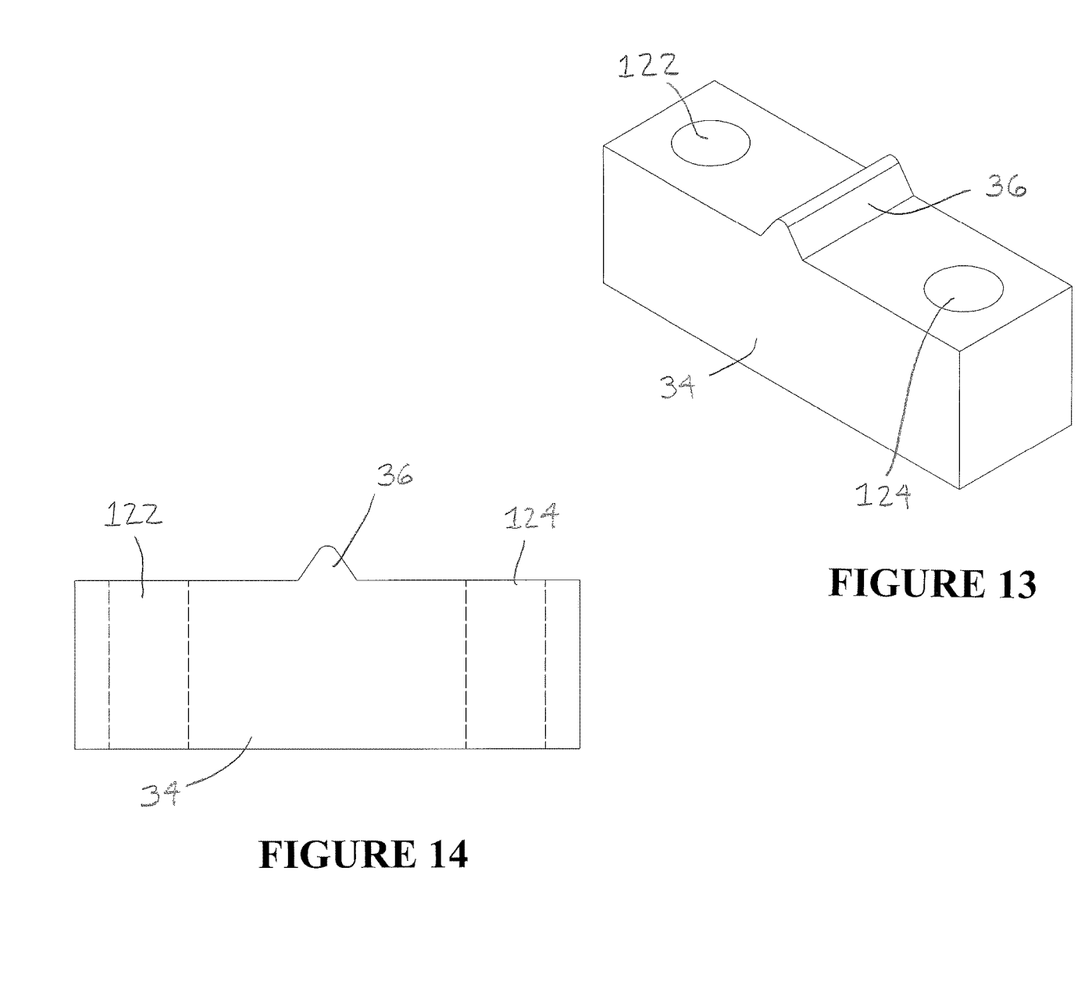
FIG. 13 is a perspective view of the preferred block of the preferred mounting assembly illustrated in FIGS. 1-12.
FIG. 14 is a front view of the preferred block of the preferred mounting assembly illustrated in FIGS. 1-13.

Referring now to FIG. 13, a perspective view of preferred block 34 of preferred mounting assembly 20 is illustrated. As shown in FIG. 13, preferred block 34 comprises raised portion 36. Preferred raised portion 36 is defined by a pair of substantially planar, sloped surfaces and a rounded top surface which together form a generally triangular cross-sectional shape. The two bases of the sloped surfaces define a maximum width of raised portion 36 and the tops of the sloped surfaces define a minimum width of the raised portion. In the preferred embodiments of the mounting assembly of the invention, the minimum width of raised portion 36 is smaller than the minimum channel width of channel 56 of pin 50 and the maximum width of the raised portion is smaller than the maximum channel width of the channel of the pin. Preferred block 34 also comprises block bolt apertures 122 and 124.

Referring now to FIG. 14, a front view of preferred block 34 of preferred mounting assembly 20 is illustrated. As shown in FIG. 14, preferred block 34 comprises raised portion 36 having a pair of substantially planar, sloped surfaces and a rounded top surface that together form a substantially triangular cross-sectional shape. Preferred block 34 also comprises block bolt apertures 122 and 124. While FIGS. 13 and 14 illustrate the preferred configuration and arrangement of the block, it is contemplated within the scope of the invention that the block may be of any suitable configuration and arrangement.

The invention also comprises a method for mounting an actuator having a cap end and a piston end on an item of equipment such as a rock crusher. The preferred method comprises providing a mounting assembly as described and claimed herein. The preferred method also comprises moving the actuator between a retracted position and an extended position. In other preferred embodiments of the method for mounting an actuator, the method comprises moving the second location of the item of equipment relative to the first location of the item of equipment and moving the pin between a first pin position and a second pin position.

In operation, several advantages of the preferred embodiments of the apparatus and method for an actuator mounting assembly are achieved. For example, the preferred embodiments of the mounting assembly reduce friction, heat, and wear. The preferred embodiments of the mounting assembly also minimize, if not eliminate, failures and have a longer lifespan. The preferred embodiments of the mounting assembly also have an axis of rotation near the surface of the pin. The preferred embodiments of the mounting assembly further have a pin that does not move rotationally relative to the actuator.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A mounting assembly mounted to an actuator having a base end and a piston end on an item of equipment, said mounting assembly comprising:
    (a) a plate, said plate being adapted to be mounted to the item of equipment at a first location;
    (b) a pin hole, said pin hole being disposed on the plate and being formed in part by a raised portion of a block;
    (c) a pin, said pin being disposed in the pin hole and having a pin diameter, a longitudinal axis, and a channel;
wherein the pin affixed to the base end of the actuator; and wherein the piston end of the actuator is mounted to the item of equipment at a second location; and wherein the actuator is adapted to move between a retracted position and an extended position; and wherein the channel of the pin is seated on the raised portion of the pin hole.

2. The mounting assembly of claim 1 wherein the second location of the item of equipment is adapted to move relative to the first location of the item of equipment.

3. The mounting assembly of claim 1 wherein the plate comprises at least two plates.

4. The mounting assembly of claim 3 wherein the at least two plates are spaced apart from each other.

5. The mounting assembly of claim 1 wherein the plate has a plurality of pin holes.

6. The mounting assembly of claim 1 wherein the pin hole comprises a pin hole diameter that is larger than the pin diameter.

7. The mounting assembly of claim 1 wherein the pin has a plurality of channels.

8. The mounting assembly of claim 7 wherein the plurality of channels are disposed substantially parallel to the longitudinal axis of the pin.

9. The mounting assembly of claim 1 wherein the pin comprises a groove disposed along the longitudinal axis.

10. The mounting assembly of claim 9 wherein the groove is adapted to convey a lubricant to the base end of the actuator.

11. The mounting assembly of claim 1 wherein the pin comprises a bolt hole.

12. The mounting assembly of claim 1 wherein the pin comprises a plurality of bolt holes.

13. The mounting assembly of claim 1 further comprising an actuator bolt, said actuator bolt being adapted to affix the pin to the base end of the actuator.

14. The mounting assembly of claim 1 further comprising a cap, said cap being disposed on an end of the pin.

15. The mounting assembly of claim 14 further comprising a cap bolt, said cap bolt being adapted to attach the cap to the pin.

16. A mounting assembly mounted to an actuator having a base end and a piston end on an item of equipment, said mounting assembly comprising:
(a) a plate, said plate being adapted to be mounted to the item of equipment at a first location and having a canal;
(b) a block, said block being adapted to be removably attached to the plate and having a raised portion;
(c) a pin having a pin diameter, a longitudinal axis, and a channel, wherein said pin being disposed in the canal and on the plate and said canal being formed in part by the raised portion of the block;

wherein the pin is affixed to the base end of the actuator; and wherein the piston end of the actuator is mounted to the item of equipment at a second location; and wherein the actuator is adapted to move between a retracted position and an extended position; and wherein the channel of the pin is seated on the raised portion of the block.

17. A method of mounting an actuator having a base end and a piston end on an item of equipment, said method comprising:
(a) providing a mounting assembly, said mounting assembly comprising:
(i) a plate, said plate being adapted to be mounted to the item of equipment at a first location;
(ii) a pin hole, said pin hole being disposed on the plate and being formed in part by a raised portion of a block;
(iii) a pin, said pin being disposed in the pin hole and having a pin diameter, a longitudinal axis, and a channel;

wherein the pin is affixed to the base end of the actuator; and wherein the piston end of the actuator is mounted to the item of equipment at a second location; and wherein the actuator is adapted to move between a retracted position and an extended position; and wherein the channel of the pin is seated on the raised portion of the pin hole;
(b) moving the actuator between a retracted position and an extended position.

18. The method of claim 17 further comprising:
(c) moving the second location of the item of equipment relative to the first location of the item of equipment.

19. The method of claim 17 further comprising:
(c) moving the pin between a first pin position and a second pin position.

* * * * *